United States Patent
Liu et al.

(10) Patent No.: US 12,249,114 B1
(45) Date of Patent: Mar. 11, 2025

(54) STRIPE IMAGE PROCESSING METHOD AND APPARATUS FOR CAMERA OPTICAL COMMUNICATION

(71) Applicants: Hubei University of Economics, Hubei (CN); Dachang Technology Development Co., Ltd, Wuhan (CN)

(72) Inventors: Wenping Liu, Hubei (CN); Qian Deng, Hubei (CN); Guoqiang Fu, Hubei (CN); Sihan Li, Hubei (CN); Zeliang Huang, Hubei (CN); Zhongwei Chen, Hubei (CN); Yamin Li, Hubei (CN)

(73) Assignees: Hubei University of Economics, Hubei (CN); Dachang Technology Development Co., Ltd, Wuhan (CN)

( * ) Notice: Subject to any disclaimer, the term of this patent is extended or adjusted under 35 U.S.C. 154(b) by 0 days.

(21) Appl. No.: 18/795,162

(22) Filed: Aug. 5, 2024

(30) Foreign Application Priority Data

Jun. 6, 2024 (CN) .......................... 202410725911.4

(51) Int. Cl.
*G06V 10/75* (2022.01)
*G06V 10/771* (2022.01)

(52) U.S. Cl.
CPC .......... *G06V 10/751* (2022.01); *G06V 10/771* (2022.01)

(58) Field of Classification Search
None
See application file for complete search history.

(56) References Cited

U.S. PATENT DOCUMENTS

| | | | | |
|---|---|---|---|---|
| 2016/0182796 | A1* | 6/2016 | Ryan | H04N 25/60 348/229.1 |
| 2016/0191159 | A1* | 6/2016 | Aoyama | H04B 10/116 398/172 |
| 2017/0237488 | A1* | 8/2017 | Aoyama | H04M 11/00 398/118 |
| 2022/0416888 | A1* | 12/2022 | Shalunov | H04B 10/116 |

* cited by examiner

*Primary Examiner* — Ian L Lemieux
(74) *Attorney, Agent, or Firm* — JCIPRNET

(57) ABSTRACT

The disclosure belongs to the field of visible light communication, and specifically discloses a stripe image processing method and apparatus for camera optical communication. The method includes: obtaining a stripe image data set, the stripe image data set including a stripe image sample and a stripe sequence label corresponding to the stripe image sample and a stripe-free image label; based on the stripe image sample and the stripe sequence label corresponding to the stripe image sample and the stripe-free image label, training a generative adversarial network to obtain an image reconstruction model and a stripe extraction model; among them, the image reconstruction model serves as a generator of the generative adversarial network, and the stripe extraction model serves as a discriminator of the generative adversarial network.

16 Claims, 10 Drawing Sheets

Obtain a stripe image data set, in which the stripe image data set includes a stripe image sample and a stripe sequence label corresponding to the stripe image sample and a stripe-free image label — S101

Based on the stripe image sample and the stripe sequence label corresponding to the stripe image sample and the stripe-free image label, train a generative adversarial network to obtain an image reconstruction model and a stripe extraction model — S102

STRIPE IMAGE PROCESSING METHOD AND APPARATUS FOR CAMERA OPTICAL COMMUNICATION

CROSS-REFERENCE TO RELATED APPLICATION

This application claims the priority benefit of China application serial no. 202410725911.4, filed on Jun. 6, 2024. The entirety of the above-mentioned patent application is hereby incorporated by reference herein and made a part of this specification.

BACKGROUND

Technical Field

The disclosure belongs to the field of visible light communication, and more specifically, relates to a stripe image processing method, device, and apparatus for camera optical communication.

Description of Related Art

Visible light communication is a technology that uses visible light bands for communication. It uses the characteristics of visible light for data transmission and transmits information by modulating the brightness or color of light.

The principle of visible light communication is to use a light source such as an LED light or a laser to emit a light signal, and a receiving end uses a camera to receive and decode the light signal to achieve data transmission. In a visible light communication scenario, when the light source emits the light signal, it will flicker at a certain frequency. The flicker is invisible to the naked eye. When the light signal is transmitted to the receiving end, the receiving end captures the image at a certain frame rate through the light sensor in the camera. Since the flicker frequency of the LED light is different from the frame rate of the camera, the stipe phenomenon appears in the captured image, where alternating light and dark stripes appear in the image. The spacing and brightness changes of the stripes correspond to the flicker frequency and brightness changes of the LED light, so that the stripe sequence may be obtained by extracting the stripes in the image, and then the light signal may be decoded.

For stripe images, there are generally stripe image reconstruction tasks and stripe extraction tasks. The stripe image reconstruction task is used to eliminate stripes in the image and restore the background image, and the stripe extraction task is used to extract stripes in the image. The image reconstruction and the stripe extraction are a pair of contradictory tasks. When there are too many black stripes in the image, it is beneficial to the task of stripe extraction but not conducive to image reconstruction; on the contrary, when there are fewer black stripes, it is beneficial to the task of image reconstruction but not conducive to the task of stripe extraction. In visible light communication scenarios, how to balance an image reconstruction accuracy and a stripe extraction accuracy is an urgent technical issue that needs to be solved in the field.

SUMMARY

In view of the shortcomings of the related art, the purpose of the disclosure is to achieve a balanced image reconstruction accuracy and stripe extraction accuracy in a visible light communication scenario.

In order to achieve the above purpose, in the first aspect, the disclosure provides a stripe image processing method for camera optical communication, including:

A stripe image data set is obtained, in which the stripe image data set includes a stripe image sample and a stripe sequence label corresponding to the stripe image sample and a stripe-free image label.

Based on the stripe image sample and the stripe sequence label corresponding to the stripe image sample and the stripe-free image label, a generative adversarial network is trained to obtain an image reconstruction model and a stripe extraction model, in which the image reconstruction model is used to reconstruct a stripe image into a stripe-free image, and the stripe extraction model is used to extract stripes based on stripe images.

Among them, the image reconstruction model serves as a generator of the generative adversarial network, and the stripe extraction model serves as a discriminator of the generative adversarial network.

What needs to be explained is that a stripe sequence carried by the stripe image is used to represent visible light communication encoding information. The stripe sequence label, as the label for stripe extraction in the supervised training process, may be obtained by manually extracting stripes from the stripe image sample. The stripe-free image label, as the label for image reconstruction in the supervised training process, may be a stripe-free image obtained by manually collecting images of the environmental background without visible light communication, and the environmental background is the same as the environmental background shown in the corresponding stripe image sample. For the above-mentioned situation without visible light communication, in this case, if a visible light communication apparatus is deployed, the visible light communication apparatus suspends controlling the flicker of light sources in a surrounding environment.

It is understandable that image reconstruction and stripe extraction are a pair of adversarial (contradictory) tasks. By using the stripe image data set and GAN to generate adversarial tasks of two contradictory natures, the image reconstruction accuracy and the stripe extraction accuracy may be effectively balanced, and the image reconstruction model and the stripe extraction model suitable for visible light communication scenarios may be obtained.

In a possible implementation, based on the stripe image sample and the stripe sequence label corresponding to the stripe image sample and the stripe-free image label, the generative adversarial network is trained to obtain the image reconstruction model and the stripe extraction model, including:

Based on the stripe image sample and the stripe sequence label corresponding to the stripe image sample and the stripe-free image label, a loss value is continuously calculated and model parameters are continuously optimized until a training stop condition is met.

The loss value is calculated and the model parameters are optimized, including:

The stripe image sample and the corresponding stripe sequence label are input to the image reconstruction model to obtain a reconstructed image in a training stage output by the image reconstruction model.

The stripe image sample is input to the stripe extraction model to obtain a stripe extraction result of the stripe image sample output by the stripe extraction model, the stripe-free image label is input to the stripe extraction model to obtain a stripe extraction result of the stripe-free image output by the stripe extraction model, and the reconstructed image in the training stage is input to the stripe extraction model to obtain a stripe extraction result of the reconstructed image output by the stripe extraction model.

Based on the reconstructed image in the training stage, the stripe extraction result of the reconstructed image, and the stripe-free image label, the loss value corresponding to the image reconstruction model is obtained, and based on the stripe extraction result of the stripe image sample, the stripe extraction result of the stripe-free image, the stripe extraction result of the reconstructed image, and the stripe sequence label, the loss value corresponding to the stripe extraction model is obtained.

Based on the loss value corresponding to the image reconstruction model and the loss value corresponding to the stripe extraction model, the model parameters are optimized through a back-propagation method.

The above-mentioned training stop condition may be satisfied when the loss value is less than a preset loss threshold, or a maximum number of iterative training rounds is reached. For the stripe extraction result of the stripe image sample, a data structure thereof may be in the form of a sequence, that is, the stripe sequence. For the stripe extraction result of the stripe-free image, it may be the stripe extraction result obtained by processing the stripe-free image label by the stripe extraction model. For the stripe extraction result of the reconstructed image, the data structure thereof may be in the form of a sequence, that is, the stripe sequence.

In a possible implementation, the loss value corresponding to the image reconstruction model is obtained based on the reconstructed image in the training stage, the stripe extraction result of the reconstructed image, and the stripe-free image label, including:

A difference between pixels in the reconstructed image in the training stage and corresponding pixels in the stripe-free image label (which may be calculated by calculating a L1 loss) is compared to obtain a first-type generator loss.

A difference between the stripe extraction result of the reconstructed image and the stripe sequence corresponding to the stripe-free image is compared to obtain a second-type generator loss.

Based on the first-type generator loss and the second-type generator loss, a weighted sum is performed to obtain the loss value corresponding to the image reconstruction model.

For the stripe sequence corresponding to the stripe-free image, an example is given here. If 0 is used to indicate that a column (or row) of pixels in the image is striped, and 1 is used to indicate that a column (or row) of pixels in the image is stripe-free, then the stripe sequence corresponding to the stripe-free image is a sequence of all 1s.

The above comparison of the difference between the stripe extraction result of the reconstructed image and the stripe sequence corresponding to the stripe-free image may specifically be the calculation of the binary cross entropy (BCE) loss or the calculation of the mean squared error (MSE) loss.

In a possible implementation, the loss value corresponding to the stripe extraction model is obtained based on the stripe extraction result of the stripe image sample, the stripe extraction result of the stripe-free image, the stripe extraction result of the reconstructed image, and the stripe sequence label, including:

A difference between the stripe extraction result of the stripe image sample and the stripe sequence label is compared to obtain a first-type discriminator loss.

A difference between the stripe extraction result of the stripe-free image and the stripe sequence corresponding to the stripe-free image is compared to obtain a second-type discriminator loss.

A difference between the stripe extraction result of the reconstructed image and the stripe sequence label is compared to obtain a third-type discriminator loss.

Based on the first-type discriminator loss, the second-type discriminator loss, and the third-type discriminator loss, a weighted sum is performed to obtain the corresponding loss value of the stripe extraction model.

The above comparison of the difference between the stripe extraction result of the stripe image sample and the stripe sequence label may specifically be the calculation of the BCE loss or the calculation of the MSE loss.

The above comparison of the difference between the stripe extraction result of the stripe-free image and the stripe sequence corresponding to the stripe-free image may specifically be the calculation of the BCE loss or the calculation of the MSE loss.

The above comparison of the difference between the stripe extraction result of the reconstructed image and the stripe sequence label may specifically be the calculation of the BCE loss or the calculation of the MSE loss.

Optionally, in the weighted summation process, a ratio of a weight coefficient corresponding to the loss of the second-type discriminator divided by a weight coefficient corresponding to the loss of the third-type discriminator is greater than or equal to 10.

It should be noted that the weight coefficient corresponding to the loss of the second-type discriminator and the weight coefficient corresponding to the loss of the third-type discriminator differ by at least one order of magnitude. A difference of one order of magnitude means that the difference between the two quantities is 10 times. For example, if the weight coefficient corresponding to the loss of the third-type discriminator is 0.05 and the weight coefficient corresponding to the loss of the second-type discriminator is 0.5, then the two quantities differ by an order of magnitude.

In a possible implementation, after obtaining the image reconstruction model and the stripe extraction model, it also includes:

The stripe image of the surrounding environment is obtained through a camera, in which the light sources in the surrounding environment flicker under the control of the visible light communication apparatus.

The stripe image is input to the image reconstruction model to obtain the reconstructed image output by the image reconstruction model; and/or the stripe image is input to the stripe extraction model to obtain the stripe sequence output by the stripe extraction model.

In one possible implementation, the image reconstruction model is constructed based on an encoder and a decoder, and feature maps of the encoder and the decoder are connected through skip connections (or referred to as residual connections). The encoder is used to downsample image features, and the decoder is used to upsample image features.

Optionally, the image reconstruction model is constructed based on a U-Net network. The U-Net network is a fully convolutional network with a symmetrical U-shaped structure. The U-Net network structure includes encoder and decoder parts, the encoder is used to extract image features, and the decoder is used to map the features back to the original image size. In the encoder part, the U-Net network uses a convolutional neural network (CNN) for feature extraction, while using pooling operations to reduce the size of the feature map. In the decoder part, the U-Net network uses upsampling to increase the size of the feature map, and connects the feature maps of the encoder and the decoder parts through skip connections to help the network learn better feature representations.

Illustratively, the encoder is composed of N number of downsampling modules, and correspondingly, the decoder is composed of N number of upsampling modules.

The downsampling module is constructed by cascading a convolutional layer, a batch normalization module, and a random dropout layer.

The upsampling module is constructed by cascading a transposed convolution module, a batch normalization module, a Relu activation function module, and a random dropout layer.

Optionally, in order to ensure that a reconstructed image size output by the image reconstruction model is consistent with the original image size, a reconstruction module may be connected after a last upsampling module of the encoder. The reconstruction module is used to map the features of the last upsampling module back to the original image size.

Illustratively, the reconstruction module is composed by cascading an upsampling layer, a zero padding layer, a convolutional layer, a Tanh activation function module, and a pixel value scaling layer. The upsampling layer may adopt the upsampling method of nearest neighbor interpolation.

For the pixel value scaling layer, it may be achieved through the following pixel value scaling formula $Pixel_{ValueOut}=(Pixel_{ValueIn}+1)/2$. Among them, $Pixel_{ValueIn}$ represents the input of the pixel value scaling layer, which is the output of the Tanh activation function module, and $Pixel_{ValueOut}$ represents the output of the pixel value scaling layer; it can be understood that the output result of the Tanh activation function is in the (−1, 1) interval, and the range of the pixel value is (0, 1). The output value of the Tanh activation function module is scaled through the above pixel value scaling formula to adjust to the (0, 1) interval.

In a possible implementation, one or more skip connections in the image reconstruction model are constructed based on a dual cross-attention (DCA) module.

The dual cross-attention module is constructed based on a channel cross attention (CCA) module and a spatial cross attention (SCA) module.

For example, the dual cross-attention module specifically includes a multi-scale patch embedding module, a channel cross attention module, a spatial cross attention module, a normalization module, and an activation function module.

One or more feature layers of the encoder may be used as input to input to the multi-scale patch embedding module, so as to obtain a vector representation of the encoder. The vector representation may be composed of multiple tokens. Then, the vector representation of the encoder is processed through the dual cross-attention mechanism formed by the channel cross attention module and the spatial cross attention module, and the vector representation is updated to capture long-distance dependencies. Then, the updated vector representation is serialized and upsampled using the normalization module and the activation function module, and connected to the corresponding layer of the decoder. Among them, the activation function module may use Gaussian error linear unit (GeLU).

In a possible implementation, the stripe extraction model is constructed by cascading a sequence generation network, multiple convolutional layers, a linear layer, and an activation function module.

For the sequence generation network, it may be configured with multiple channels, and each channel is implemented by a feature extraction module. The input of each channel is the same, and the output features of multiple channels are aggregated and then input to subsequent convolutional layers; the sequence generation network is used to recognize stripe sequences in images and generate sequence features, which are input to the subsequent convolutional layers.

For example, the feature extraction module in the sequence generation network may be constructed by stacking a series of building blocks. Stacking a series of building blocks may be cascading a batch normalization (BN) module, an attention module, another BN module, and a multi-layer perception module. A skip connection is provided between the input of the first batch normalization module and the output of the attention module, and a skip connection is provided between the input of the second batch normalization module and the output of the multi-layer perception module.

The attention module of the feature extraction module may be constructed by cascading a convolutional layer, a GeLU activation function, a multi-scale convolutional attention module, and a convolutional kernel of a size of 1×1, in which the convolutional layer may use a convolutional kernel of a size of 1×1.

The multi-scale convolutional attention module may be constructed by cascading four convolutional layers. Among them, the first convolutional layer uses a depth-wise separable convolutional kernel of a size of 5×5; the second convolutional layer is provided with three channels, respectively using a depth-wise separable convolutional kernel of a size of 1×7, a depth-wise separable convolutional kernel of a size of 1×11, and a depth-wise separable convolutional kernel of a size of 1×21; the third convolutional layer is provided with three channels, respectively using a depth-wise separable convolutional kernel of a size of 7×1, a depth-wise separable convolutional kernel of a size of 11×1, and a depth-wise separable convolutional kernel of a size of 21×1; the fourth convolutional layer uses a convolutional kernel of a size of 1×1; a skip connection based on the convolutional attention mechanism is provided between the input of the first convolutional layer and the output of the fourth convolutional layer; and a skip connection is provided between the output of the first convolutional layer and the output of the third convolutional layer.

The multi-layer perception module may be constructed by cascading a convolutional kernel of a size of 1×1, a depth-wise separable convolutional kernel of a size of 3×3, a GeLU, and a convolutional layer, in which the convolutional layer may use a convolutional kernel of a size of 1×1.

In a second aspect, the disclosure provides a stripe image processing device for camera optical communication, including:

A sample acquisition module is used to obtain a stripe image data set, in which the stripe image data set includes a stripe image sample and a stripe sequence label corresponding to the stripe image sample and a stripe-free image label;

A model training module is used to train a generative adversarial network based on the stripe image sample and the stripe sequence label corresponding to the stripe image sample and the stripe-free image label, and obtain an image reconstruction model and a stripe extraction model, in which the image reconstruction model is used to reconstruct a stripe image into a stripe-free image, and the stripe extraction model is used to extract stripes based on stripe images;

Among them, the image reconstruction model serves a generator of the generative adversarial network, and the stripe extraction model serves a discriminator of the generative adversarial network.

In a third aspect, the disclosure provides an electronic apparatus, including: at least one memory used to store a program; and at least one processor, used to execute the program stored in the memory. When the program stored in the memory is executed, the processor is used to execute the method described in the first aspect or any possible implementation manner of the first aspect.

It can be understood that the beneficial effects of the above-mentioned second aspect to the third aspect may be found in the relevant description of the above-mentioned first aspect, so details will not be repeated here.

DESCRIPTION OF THE EMBODIMENTS

Figure 1:
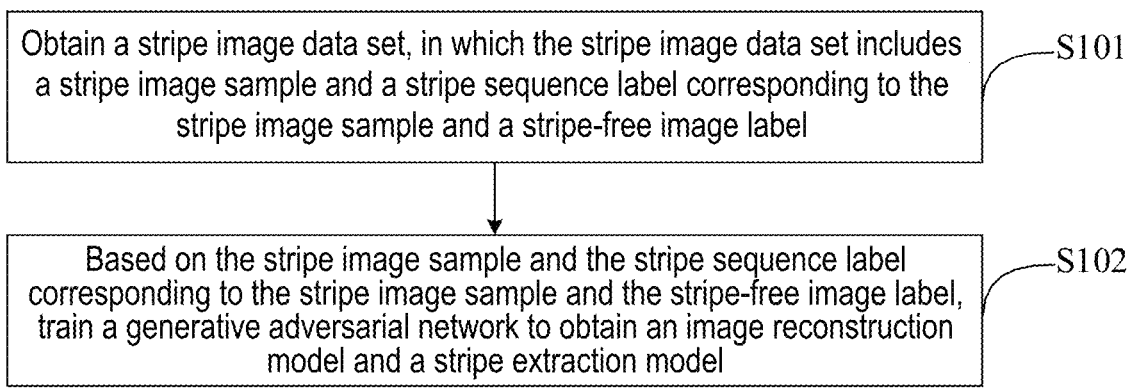
FIG. 1 is a schematic flowchart of a stripe image processing method for camera optical communication provided by an embodiment of the disclosure.

In order to facilitate a clearer understanding of each embodiment of the disclosure, some relevant background knowledge is first introduced as follows.

For the application of a standard GAN network in image reconstruction tasks, the generator and the discriminator together constitute the two parts of GAN. The generator is responsible for downsampling the input image and then upsampling it to obtain the reconstructed image output. The discriminator uses the convolutional layer to obtain the discrimination result of the discrimination output based on the two input images (such as the real image and the reconstructed image), in which the output of the discriminator is an array indicating whether each part in the original image belongs to the real image.

The loss function of the model includes two parts. One is the generator loss, and the other is the discriminator loss. Among them, the generator loss includes the reconstruction loss of the real image and the predicted image and the discrimination loss from the discriminator. The discrimination loss of the discriminator reflects whether the discriminator thinks the output of the generator is a real image; the loss of the discriminator includes the discrimination of real image pairs using MSE loss and the discrimination of false images using MSE loss. The two networks (generator and discriminator) continuously learn to form an adversarial process. The task of the generator is to make the difference between the output and the real image small, and at the same time, generate content that may fool the discriminator as much as possible. The optimization goal of the discriminator is to train itself, so that it may recognize which image is a real image and which is an image generated by the generator.

In order to make the purpose, technical solutions, and advantages of the disclosure more comprehensible, the disclosure is further described in detail below together with the accompanying drawings and embodiments. It should be understood that the specific embodiments described herein are only used to explain the disclosure, and the embodiments are not used to limit the disclosure.

The term "and/or" in the disclosure is an association relationship that describes related objects, indicating that there can be three relationships. For example, A and/or B can represent the three situations: A exists alone, A and B exist simultaneously, and B exists alone. The symbol "/" in the disclosure indicates that the associated object is in an or relationship, for example, A/B means A or B.

In the embodiments of the disclosure, words such as "illustrative" or "for example" are used to indicate examples, instances, or illustrations. Any embodiment or design described as "illustrative" or "for example" in the embodiments of the disclosure should not be construed as being preferred or advantageous over other embodiments or designs. Rather, the use of words such as "illustrative" or "for example" are intended to present the relevant concepts in a concrete fashion.

In the description of the embodiments of the disclosure, unless otherwise specified, the meaning of "multiple" refers to two or more than two, for example, multiple processing units refers to two or more processing units; a plurality of elements refers to two or more elements.

The embodiments of the disclosure will be described below with reference to the drawings in the embodiments of the disclosure.

FIG. 1 is a schematic flowchart of a stripe image processing method for camera optical communication provided by an embodiment of the disclosure. As shown in FIG. 1, the execution subject of the method may be an electronic apparatus, such as a server. The method includes the following steps S101 and S102.

In step S101, a stripe image data set is obtained, in which the stripe image data set includes a stripe image sample and a stripe sequence label corresponding to the stripe image sample and a stripe-free image label.

What needs to be explained is that a stripe sequence carried by a stripe image is used to represent visible light communication encoding information. The stripe sequence label, as the label for stripe extraction in the supervised training process, may be obtained by manually extracting stripes from the stripe image sample. The stripe-free image label, as the label for image reconstruction in the supervised training process, may be a stripe-free image obtained by manually collecting images of the environmental background without visible light communication, and the environmental background is the same as the environmental background shown in the corresponding stripe image sample. For the above-mentioned situation without visible light communication, in this case, if a visible light communication apparatus is deployed, the visible light communication apparatus suspends controlling the flicker of light sources in a surrounding environment.

In step S102, based on the stripe image sample and the stripe sequence label corresponding to the stripe image sample and the stripe-free image label, a generative adversarial network is trained to obtain an image reconstruction model and a stripe extraction model, in which the image reconstruction model is used to reconstruct a stripe image into a stripe-free image, and the stripe extraction model is used to extract stripes based on stripe images.

Among them, the image reconstruction model serves as a generator of the generative adversarial network, and the stripe extraction model serves as a discriminator of the generative adversarial network.

Generative adversarial network (GAN) consists of two neural networks: a generator and a discriminator. The generator is responsible for generating data samples, and the discriminator is responsible for determining whether the generated data samples are real or fake. The working principle of GAN is to train the generator and the discriminator against each other, so that the generator may generate sufficiently realistic data samples, and the discriminator may accurately distinguish between real data and generated data. During the training process, the generator continues to generate data samples, and the discriminator continues to learn how to better judge real data and generated data until the data samples generated by the generator cannot be distinguished by the discriminator.

It is understandable that image reconstruction and stripe extraction are a pair of adversarial (contradictory) tasks. By using the stripe image data set and GAN to generate adversarial tasks of two contradictory natures, the image reconstruction accuracy and the stripe extraction accuracy may be effectively balanced, and the image reconstruction model and the stripe extraction model suitable for visible light communication scenarios may be obtained.

The extracted stripe sequence may be easily used to decode information in visible light communications. The image reconstruction results may be used for tasks such as environment perception and target recognition and detection.

Figure 2:
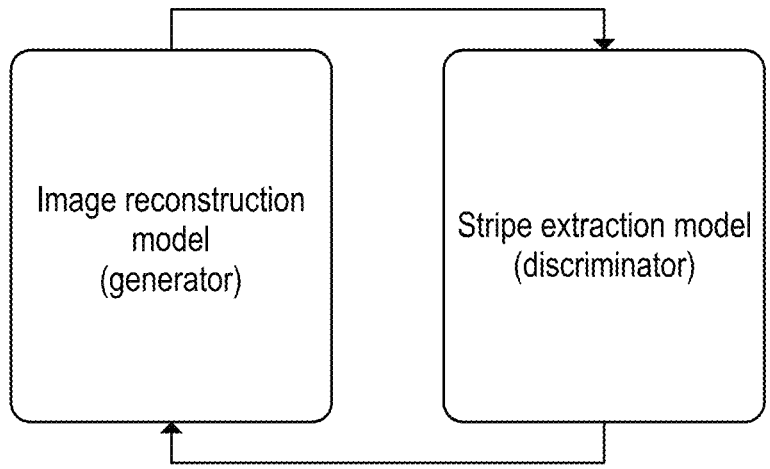
FIG. 2 is a schematic structural diagram of a GAN provided by an embodiment of the disclosure.

FIG. 2 is a schematic structural diagram of a GAN provided by an embodiment of the disclosure. As shown in FIG. 2, the image reconstruction model serves as the generator of the generative adversarial network, and the stripe extraction model serves as the discriminator of the generative adversarial network.

The image reconstruction model may be constructed based on an encoder and a decoder, and feature maps of the encoder and the decoder are connected through skip connections (or referred to as residual connections). The encoder is used to downsample image features, and the decoder is used to upsample image features.

Figure 3:
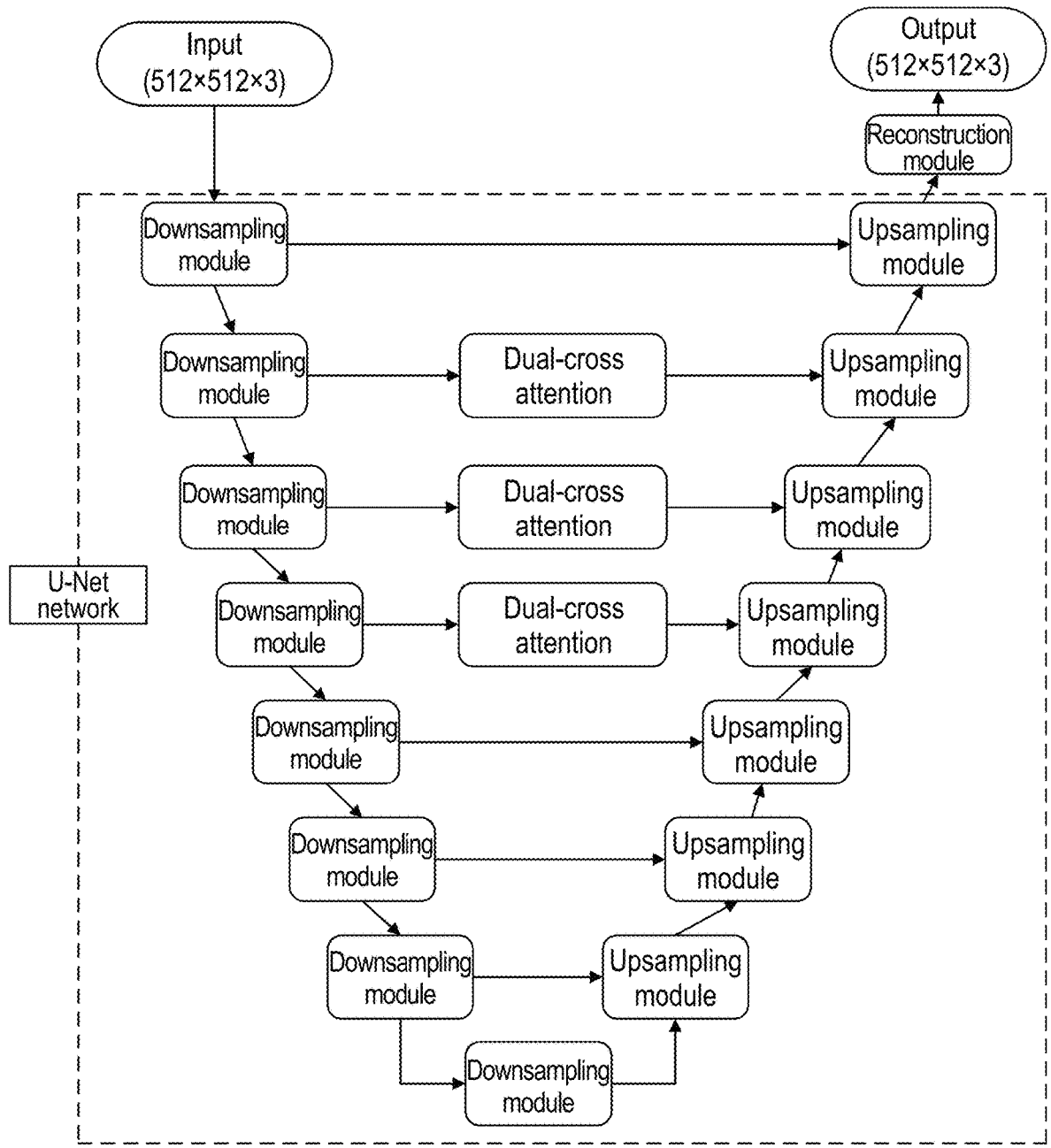
FIG. 3 is a schematic structural diagram of an image reconstruction model provided by an embodiment of the disclosure.

FIG. 3 is a schematic structural diagram of an image reconstruction model provided by an embodiment of the disclosure. As shown in FIG. 3, the image reconstruction model may be constructed based on a U-Net network. The U-Net network is a fully convolutional network with a symmetrical U-shaped structure. The U-Net network structure includes an encoder and a decoder, the encoder is used to extract image features, and the decoder is used to map the features back to the original image size. In the encoder part, the U-Net network uses a convolutional neural network (CNN) for feature extraction, while using pooling operations to reduce the size of the feature map. In the decoder part, the U-Net network uses upsampling to increase the size of the feature map, and connects the feature maps of the encoder and the decoder parts through skip connections to help the network learn better feature representations. As shown in FIG. 3, for a skip connection pointing to a certain upsampling module, the feature map transferred by the skip connection is fused with the feature map output by the upsampling module, and the fused feature map is input to a next-level module.

Illustratively, as shown in FIG. 3, the dimension of the input image (original image) of the image reconstruction model may be 512×512×3, and correspondingly, the dimension of the output image (reconstructed image) of the image reconstruction model is also 512×512×3. That is, the dimension of the input image of the image reconstruction model remains the same as the dimension of the output image.

Illustratively, the encoder is composed of N number of downsampling modules, and correspondingly, the decoder is composed of N number of upsampling modules.

Figure 4:
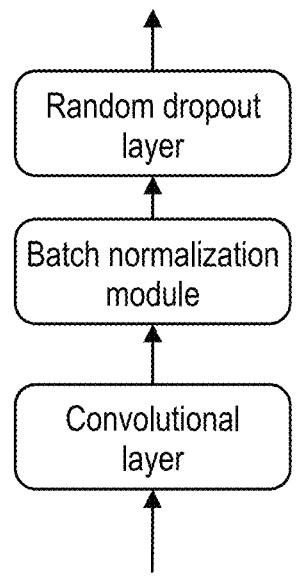
FIG. 4 is a schematic structural diagram of a downsampling module provided by an embodiment of the disclosure.

FIG. 4 is a schematic structural diagram of a downsampling module provided by an embodiment of the disclosure. As shown in FIG. 4, the downsampling module is constructed by cascading a convolutional layer, a batch normalization module, and a random dropout layer.

Figure 5:
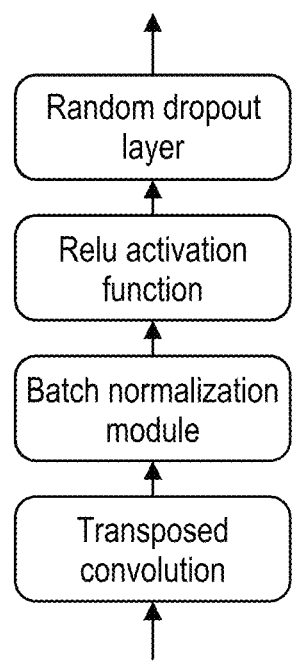
FIG. 5 is a schematic structural diagram of an upsampling module provided by an embodiment of the disclosure.

FIG. 5 is a schematic structural diagram of an upsampling module provided by an embodiment of the disclosure. As shown in FIG. 5, the upsampling module is constructed by cascading a transposed convolution module, a batch normalization module, a Relu activation function module, and a random dropout layer.

Optionally, in order to ensure that a reconstructed image size output by the image reconstruction model is consistent with the original image size, as shown in FIG. 3, a reconstruction module may be connected after a last upsampling module of the encoder. The reconstruction module is used to map the features of the last upsampling module back to the original image size.

Figure 6:
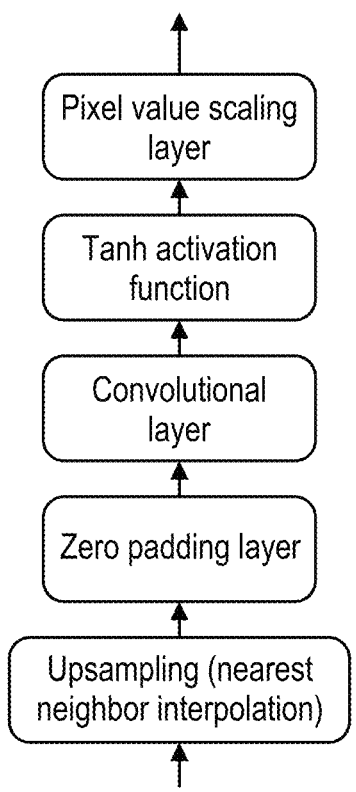
FIG. 6 is a schematic structural diagram of a reconstruction module provided by an embodiment of the disclosure.

Illustratively, FIG. 6 is a schematic structural diagram of a reconstruction module provided by an embodiment of the disclosure. As shown in FIG. 6, the reconstruction module is composed by cascading an upsampling layer, a zero padding layer, a convolutional layer, a Tanh activation function module, and a pixel value scaling layer. The upsampling layer may adopt the upsampling method of nearest neighbor interpolation.

For the pixel value scaling layer, it may be achieved through the following pixel value scaling formula $\text{Pixel}_{ValueOut}=(\text{Pixel}_{ValueIn}+1)/2$. Among them, $\text{Pixel}_{ValueIn}$ represents the input of the pixel value scaling layer, which is the output of the Tanh activation function module, and $\text{Pixel}_{ValueOut}$ represents the output of the pixel value scaling layer; it can be understood that the output result of the Tanh activation function is in the (−1, 1) interval, and the range of the pixel value is (0, 1). The output value of the Tanh activation function module is scaled through the above pixel value scaling formula to adjust to the (0, 1) interval.

In a possible implementation, one or more skip connections in the image reconstruction model are constructed based on a dual cross-attention (DCA) module.

The dual cross-attention module is constructed based on a channel cross attention (CCA) module and a spatial cross attention (SCA) module.

For example, the dual cross-attention module specifically includes a multi-scale patch embedding module, a channel cross attention module, a spatial cross attention module, a normalization module, and an activation function module.

One or more feature layers of the encoder may be used as input to input to the multi-scale patch embedding module, so as to obtain a vector representation of the encoder. The vector representation may be composed of multiple tokens. Then, the vector representation of the encoder is processed through the dual cross-attention mechanism formed by the channel cross attention module and the spatial cross attention module, and the vector representation is updated to capture long-distance dependencies. Then, the updated vector representation is serialized and upsampled using the normalization module and the activation function module, and connected to the corresponding layer of the decoder. Among them, the activation function module may use a Gaussian error linear unit (GeLU).

Figure 7:
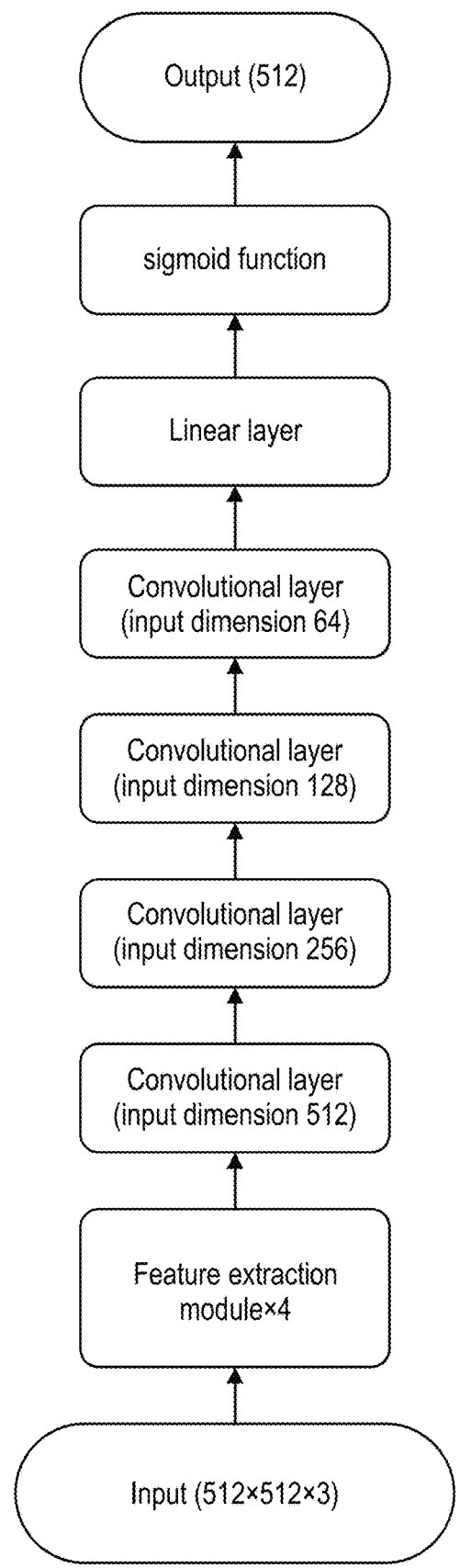
FIG. 7 is a schematic structural diagram of a stripe extraction model provided by an embodiment of the disclosure.

FIG. 7 is a schematic structural diagram of a stripe extraction model provided by an embodiment of the disclosure. As shown in FIG. 7, the stripe extraction model is constructed by cascading a sequence generation network, multiple convolutional layers, a linear layer, and an activation function module.

For the sequence generation network, it may be configured with multiple channels, and each channel is implemented by a feature extraction module. FIG. 7 shows 4 channels, that is, the feature extraction module×4; the input of each channel is the same, and the output features of multiple channels are aggregated and then input to subsequent convolutional layers; the sequence generation network is used to recognize stripe sequences in images and generate sequence features, which are input to the subsequent convolutional layers.

Illustratively, for the multiple convolutional layers in the stripe extraction model, there are 4 convolutional layers shown in FIG. 7. The input dimensions of the 4 convolutional layers are 512, 256, 128, and 64, respectively. The role of the convolutional layers here is to aggregate features, so that the final calculation through the linear layer is reduced.

Illustratively, as shown in FIG. 7, when the input image width is 512, the output dimension of the stripe extraction model is 512. A sequence consistent with the input image width may be processed by the activation function module after the linear layer, so as to control the value range of each bit in the sequence to be 0 or 1. For example, as shown in FIG. 7, the activation function module may be a sigmoid function module. It can be understood that when the camera collects images using column scanning, the sequence indicates whether the image column is black stripes in the vertical direction. For example, 0 indicates that the pixels in this column are striped, and 1 indicates that there are no stripes.

Figure 8:
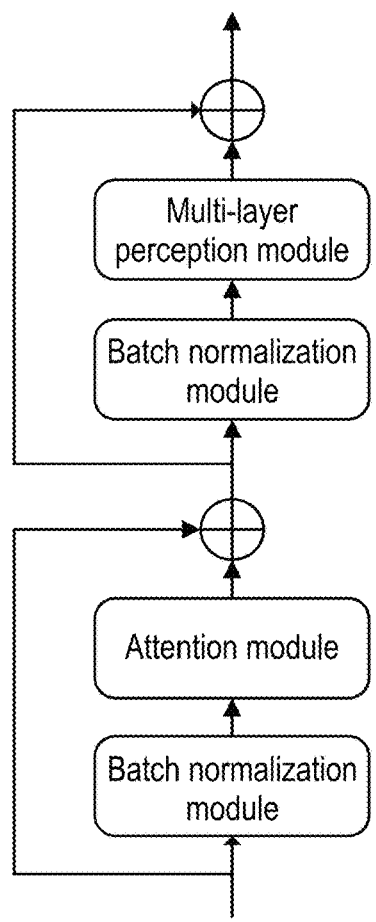
FIG. 8 is a schematic structural diagram of a feature extraction module provided by an embodiment of the disclosure.

For example, FIG. 8 is a schematic structural diagram of a feature extraction module provided by an embodiment of the disclosure. As shown in FIG. 8, the feature extraction module in the sequence generation network may be constructed by stacking a series of building blocks. As shown in FIG. 8, stacking a series of building blocks may be cascading a batch normalization (BN) module, an attention module, another BN module, and a multi-layer perception module. A skip connection is provided between the input of the first batch normalization module and the output of the attention module, and a skip connection is provided between the input of the second batch normalization module and the output of the multi-layer perception module.

Figure 9:
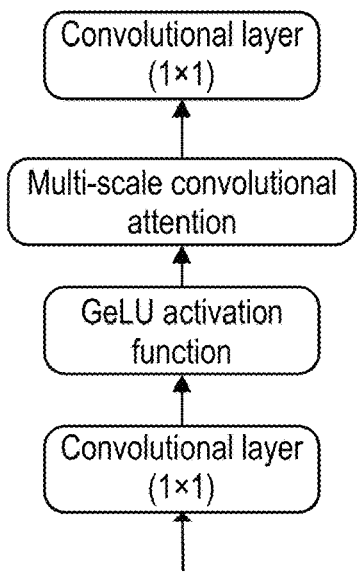
FIG. 9 is a schematic structural diagram of an attention module in a feature extraction module provided by an embodiment of the disclosure.

FIG. 9 is a schematic structural diagram of an attention module in a feature extraction module provided by an embodiment of the disclosure. As shown in FIG. 9, the attention module of the feature extraction module may be constructed by cascading a convolutional layer, a GeLU activation function, a multi-scale convolutional attention module, and a convolutional kernel of a size of 1×1, in which the convolutional layer may use a convolutional kernel of a size of 1×1.

Figure 10:
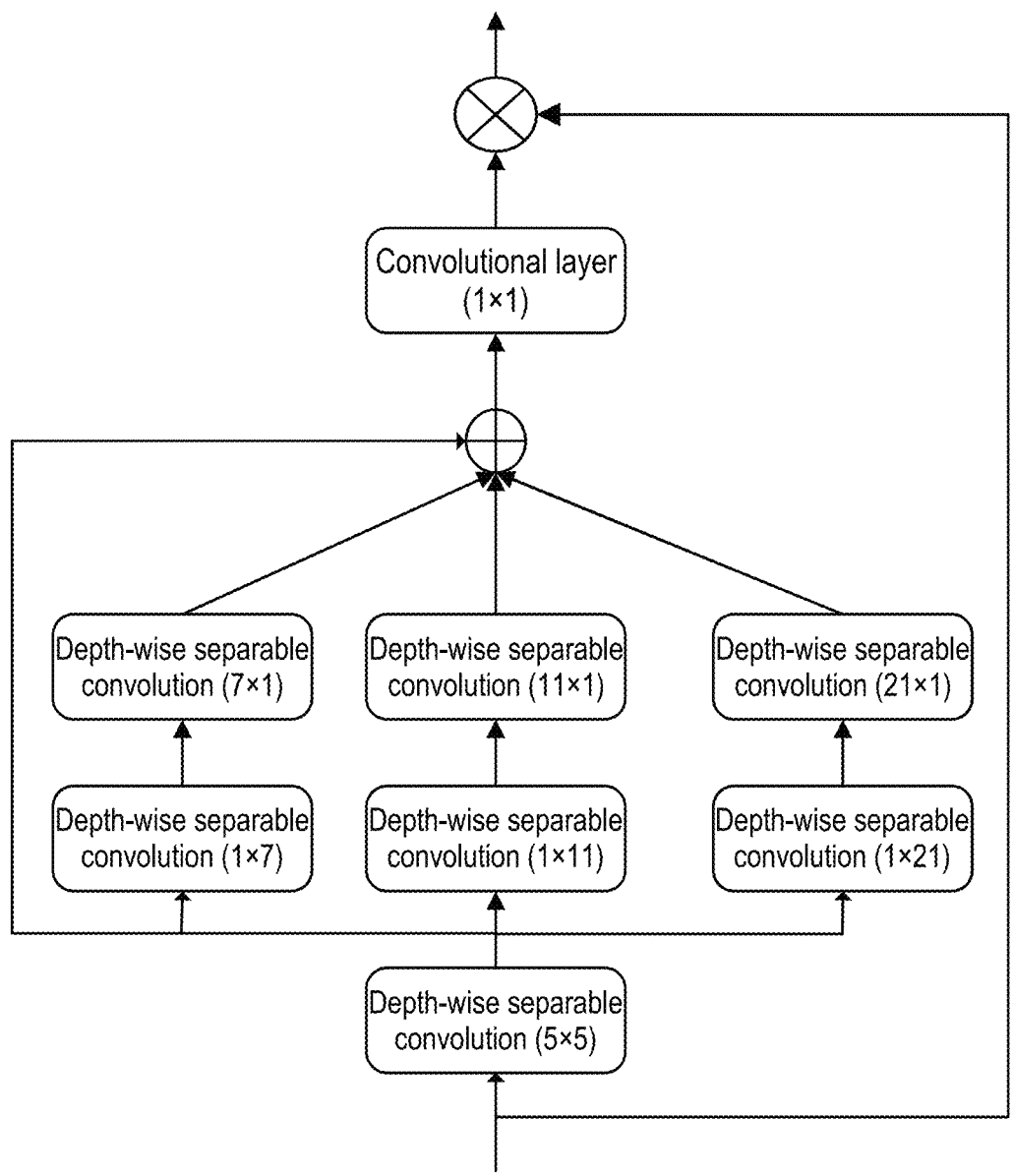
FIG. 10 is a schematic structural diagram of a multi-scale convolutional attention module provided by an embodiment of the disclosure.

FIG. 10 is a schematic structural diagram of a multi-scale convolutional attention module provided by an embodiment of the disclosure. As shown in FIG. 10, the multi-scale convolutional attention module may be constructed by cascading four convolutional layers. Among them, the first convolutional layer uses a depth-wise separable convolutional kernel of a size of 5×5; the second convolutional layer is provided with three channels, respectively using a depth-wise separable convolutional kernel of a size of 1×7, a depth-wise separable convolutional kernel of a size of 1×11, and a depth-wise separable convolutional kernel of a size of 1×21; the third convolutional layer is provided with three channels, respectively using a depth-wise separable convolutional kernel of a size of 7×1, a depth-wise separable convolutional kernel of a size of 11×1, and a depth-wise separable convolutional kernel of a size of 21×1; the fourth convolutional layer uses a convolutional kernel of a size of 1×1; a skip connection based on the convolutional attention mechanism is provided between the input of the first convolutional layer and the output of the fourth convolutional layer; and a skip connection is provided between the output of the first convolutional layer and the output of the third convolutional layer.

Figure 11:
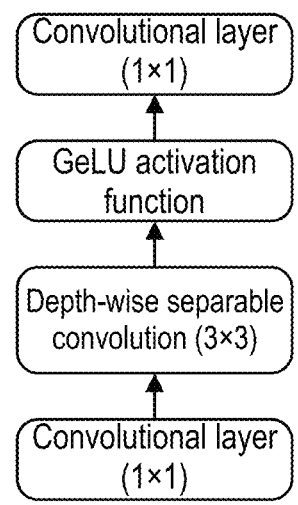
FIG. 11 is a schematic structural diagram of a multi-layer perception module provided by an embodiment of the disclosure.

FIG. 11 is a schematic structural diagram of a multi-layer perception module provided by an embodiment of the disclosure. As shown in FIG. 11, the multi-layer perception module may be constructed by cascading a convolutional kernel of a size of 1×1, a depth-wise separable convolutional kernel of a size of 3×3, a GeLU, and a convolutional layer, in which the convolutional layer may use a convolutional kernel of a size of 1×1.

Figure 12:
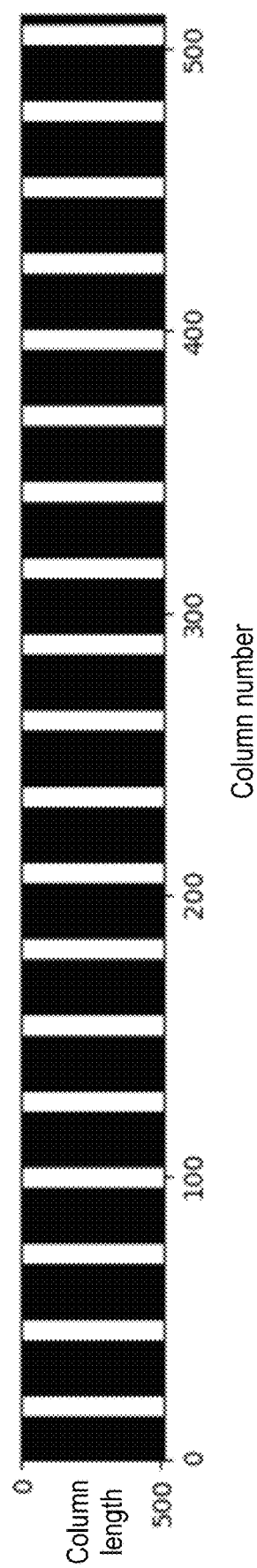
FIG. 12 is a schematic diagram of a stripe extraction experimental result provided by an embodiment of the disclosure.

After obtaining the image reconstruction model and the stripe extraction model, the stripe image of the surrounding environment is obtained through the camera, and the stripe image is input to the stripe extraction model to obtain the stripe sequence output by the stripe extraction model. FIG. 12 is a schematic diagram of a stripe extraction experimental result provided by an embodiment of the disclosure. As shown in FIG. 12, the abscissa represents the column number, and the ordinate represents the column length.

The image reconstruction loss and the stripe extraction loss are explained below.

The corresponding loss value of the image reconstruction model may be the following two types of losses.

For the first type of loss for image reconstruction (or called the first-type generator loss), there is an L1 pixel loss between the real image and the image output by the image reconstruction model. The loss serves as the first-type of loss for image reconstruction. The real image is a stripe-free image, that is, a stripe-free image label.

For the second type of loss for image reconstruction (or called the second-type generator loss), what needs to be explained in detail here is that in the image reconstruction task, the image reconstruction model may generate images without stripes as much as possible. The task of image reconstruction is to remove stripes, and the stripe extraction model here acts as a (stripe) discriminator for determining whether the image generated by the image reconstruction model contains stripes. As mentioned earlier, the image reconstruction model may generate a stripe-free image as much as possible, and then after passing through the stripe extraction model, the output sequence may be all is as much as possible. When the output sequence is all 1s, it means that the input image no longer contains stripes at this time. According to this concept, a sequence vector of all is that is consistent with the output dimension of the stripe extraction model is first defined, which is used to indicate that the sequence obtained by the stripe extraction model after the output of the desired image reconstruction model may be all 1s. Then, during the actual training process, the output of the image reconstruction model is passed through the stripe extraction model to obtain the stripe sequence and the sequence of all is for loss calculation (BCE loss or MSE loss). The loss is used as the second type of loss for image reconstruction. During the actual training process, since the output of the stripe extraction model itself is a stripe sequence, which contains stripe position information, it may well guide the image reconstruction model to reconstruct specific stripe parts during the training process.

During the training process, the images input to the stripe extraction model include: stripe images, stripe-free image labels, and reconstructed images output by the generator. The loss value corresponding to the stripe extraction model may be determined by the weighted sum of the following three types of losses.

For the first type of loss of stripe extraction (or called the first-type discriminator loss), the stripe image is input to the stripe extraction model, and the BCE loss or MSE loss of the corresponding output (stripe sequence) of the stripe extraction model and the real black stripe sequence (sequence label corresponding to the stripe image) is calculated to train the stripe extraction model's ability to extract stripe images. The loss is used as the first type of loss for stripe extraction.

For the second type of loss for stripe extraction (or called the second-type discriminator loss), as a discriminator for determining whether an image contains stripes, the stripe extraction model may also learn when an image does not have stripes. The loss at this time is the BCE loss or MSE loss of the stripe sequence of all is obtained after the stripe-free image label is processed by the stripe extraction model. The loss is used as the second type of loss for stripe extraction.

For the third type of loss for stripe extraction (or called the third-type discriminator loss), in the later stage of adversarial training, the reconstructed image output by the image reconstruction model is getting closer and closer to the real stripe-free image (background image), and it becomes increasingly difficult for the stripe extraction model to extract stripes from the reconstructed image. However, there are still residual images in the reconstructed image. In order to guide the stripe extraction model to recognize the stripes in the reconstructed image, assuming that the image output by the image reconstruction model must have stripes, the loss (BCE loss or MSE loss) between the stripe sequence obtained after the reconstructed image is processed by stripe extraction model and the real black stripe sequence is calculated as the third type of loss for stripe extraction, thereby effectively guiding the stripe extraction model to recognize stripes in the reconstructed image in the later stage of adversarial training, increasing the difficulty of the adversary, and prompting the image reconstruction model to further eliminate residual images in the reconstructed image so as to improve the training effect.

For the weight coefficients of the three types of losses for stripe extraction, since the first type of loss corresponds to the stripe extraction ability of the trained stripe extraction model, and the second type of loss corresponds to the ability of the trained stripe extraction model to recognize stripe-free images, these are the two recognition capabilities of the stripe extraction model. The third type of loss is used to enhance the difficulty of the adversary in the later stages of adversarial training, but not used to train the recognition ability of the stripe extraction model. It can be seen that the first type of loss and the second type of loss play a leading role in training during the training process, and the third type of loss plays an auxiliary role in training during the training process. That is, the weight coefficient of the third type of loss may not be too large, so as to avoid affecting the performance of the stripe extraction model. Therefore, the weight coefficient of the third type of loss is set to a relatively small value. For example, the weight coefficient of the first type of loss is 0.5, the weight coefficient of the second type of loss is 0.5, and the weight coefficient of the third type of loss is 0.03. The weight coefficient of the third type of loss is less than the weight coefficient of 0.5 of the other two types of losses.

Below is a specific example of a loss function.

The loss function corresponding to the image reconstruction model is as follows:

$$L_G = 100 \times L_{pixel} + 10 \times L_{GAN}$$

The second-type generator loss is calculated by the following formula:

$$L_{GAN} = MSE(D(G(x_{striped})), S_1)$$

Among them, $L_{GAN}$ (the second-type generator loss) represents the MSE loss calculated by comparing the output of the generator after passing through the stripe extraction model with the sequence of all 1s. $L_{pixel}$ (first-type generator loss) represents the pixel-wise L1 loss of the stripe-free image label and the image output by the image reconstruction model.

The loss function corresponding to the stripe extraction model is as follows:

$$L_D = 0.5 \times (MSE(D(x_{striped}), S_{striped}) + MSE(D(x_{origin}), S_1)) + 0.03 \times MSE(D(G(x_{striped})), S_{striped})$$

Among them, $x_{striped}$ represents the stripe image sample, $x_{origin}$ represents a stripe-free image label, d and G represent the discriminator (stripe extraction model) and generator (image reconstruction model) respectively, MSE(·) represents the MSE loss, $S_{striped}$ represents the stripe sequence label, and $S_1$ represents a sequence of all 1s.

The stripe image processing device for camera optical communication provided by the disclosure is described below. The stripe image processing device for camera optical communication described below and the stripe image processing method for camera optical communication described above may be cross-referenced with each other.

Figure 13:
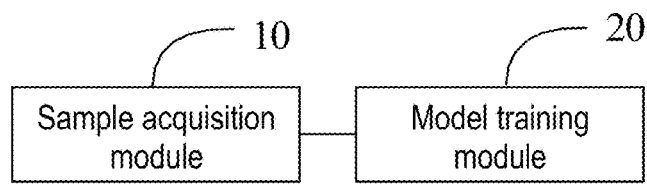
FIG. 13 is a schematic structural diagram of a stripe image processing device for camera optical communication provided by an embodiment of the disclosure.

FIG. 13 is a schematic structural diagram of a stripe image processing device for camera optical communication provided by an embodiment of the disclosure. As shown in FIG. 13, the device includes: a sample acquisition module 10 and a model training module 20, in which:

The sample acquisition module 10 is used to obtain a stripe image data set, in which the stripe image data set includes a stripe image sample and a stripe sequence label corresponding to the stripe image sample and a stripe-free image label;

The model training module 20 is used to train a generative adversarial network based on the stripe image sample and the stripe sequence label corresponding to the stripe image sample and the stripe-free image label, and obtain an image reconstruction model and a stripe extraction model, in which the image reconstruction model is used to reconstruct a stripe image into a stripe-free image, and the stripe extraction model is used to extract stripes based on stripe images;

Among them, the image reconstruction model serves as a generator of the generative adversarial network, and the stripe extraction model serves as a discriminator of the generative adversarial network.

It can be understood that the detailed functional implementation of each of the above units/modules may be found in the introduction in the foregoing method embodiments, so details will not be repeated here.

It should be understood that the above device is used to execute the method in the above embodiment. The corresponding program module in the device has implementation principles and technical effects similar to those described in the above method. For the working process of the device, please refer to the corresponding process in the above method, so details will not be repeated here.

Figure 14:
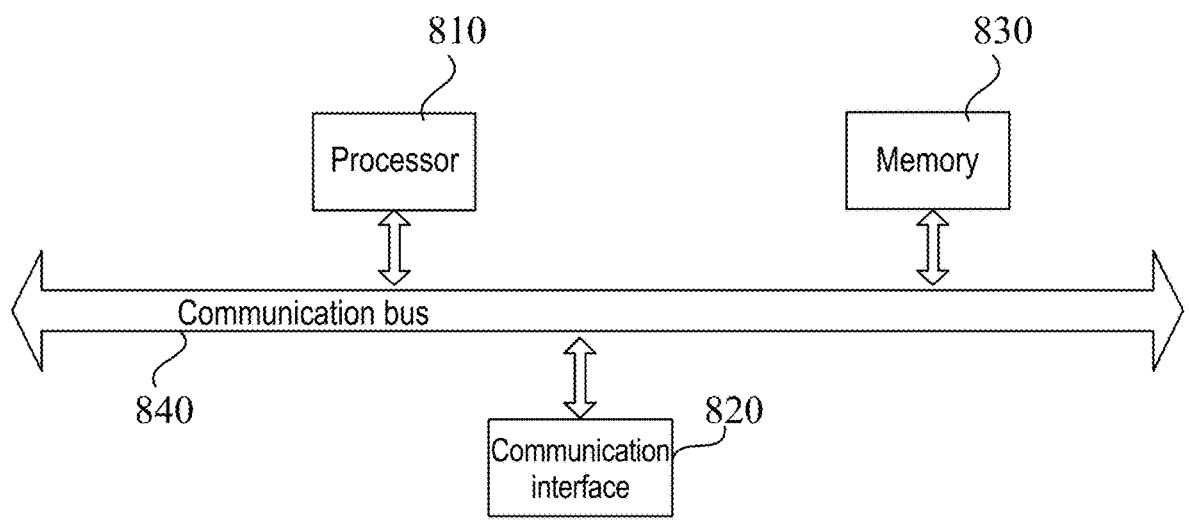
FIG. 14 is a schematic structural diagram of an electronic apparatus provided by an embodiment of the disclosure.

Based on the method in the above embodiments, an electronic apparatus is provided according to the disclosure in the embodiments. FIG. 14 is a schematic structural diagram of an electronic apparatus provided by an embodiment of the disclosure. As shown in FIG. 14, the electronic apparatus may include: a processor 810, a communication interface 820, a memory 830, and a communication bus 840. Among them, the processor 810, the communication interface 820, and the memory 830 complete communication with each other through the communication bus 840. The processor 810 may call logical commands in the memory 830 to execute the method in the above embodiments.

In addition, the above-mentioned logical commands in the memory 830 may be implemented in the form of software functional units and may be stored in a computer-readable storage medium when sold or used as an independent product. Based on this understanding, the technical solution of the disclosure, or the part that contributes to the related art, or the part of the technical solution may be embodied in the form of a software product. The computer software product is stored in a storage medium and includes a number of commands to cause a computer device (which may be a personal computer, a server, or a network device, etc.) to execute all or part of the steps of the method described in various embodiments of the disclosure.

Based on the method in the above embodiments, a computer-readable storage medium is provided according to the disclosure in the embodiment. The computer-readable storage medium stores a computer program. When the computer program runs on a processor, it causes the processor to execute the method in the above embodiments.

Based on the method in the above embodiments, a computer program product is provided according to the disclosure in the embodiment. When the computer program product runs on a processor, it causes the processor to execute the method in the above embodiments.

It is understandable that the processor in the embodiment of the disclosure may be a central processing unit (CPU), and may also be other general-purpose processors, a digital signal processor (DSP), an application specific integrated circuit (ASIC), a field programmable gate array (FPGA), or other programmable logic devices, transistor logic devices, hardware components, or combinations thereof. A general-purpose processor may be a microprocessor or any conventional processor.

The steps of the method in the embodiment of the disclosure may be implemented by hardware, or by a processor executing software commands. The software commands may be composed of corresponding software modules, and the software modules may be stored in random access memory (RAM), flash memory, read-only memory (ROM), programmable ROM (PROM), erasable PROM (EPROM), electrically EPROM (EEPROM), register, hard disk, mobile hard disk, CD-ROM, or any other form of storage media well known in the art. An exemplary storage medium is coupled to the processor such that the processor may read information from, and write information to, the storage medium. Of course, the storage medium may also be an integral part of the processor. The processor and the storage medium may be located in an ASIC.

In the above embodiments, it may be implemented in whole or in part by software, hardware, firmware, or combinations thereof. When implemented using software, it may be implemented in whole or in part in the form of a computer program product. The computer program product includes one or more computer commands. When the computer program commands are loaded and executed on a computer, the process or function described in the embodiments of the disclosure is generated in whole or in part. The computer may be a general purpose computer, a special purpose computer, a computer network, or other programmable device. The computer commands may be stored in the computer-readable storage medium or transmitted via the computer-readable storage medium. The computer commands may be sent from a website, computer, server, or data center via a wired (for example, coaxial cable, optical fiber, digital subscriber line (DSL)) or wireless (for example, infrared, wireless, microwave) manner to another website, computer, server, or data center. The computer-readable storage medium may be any available medium that may be accessed by a computer or may be a data storage device such as a server or a data center including one or more available media. The available medium may be a magnetic medium (for example, a floppy disk, a hard disk, a magnetic tape), an optical medium (for example, a DVD), or a semiconductor medium (for example, a solid state disk (SSD)).

It should be understood that the various numerical numbers involved in the embodiments of the disclosure are only used for the convenience of description and are not used to limit the scope of the embodiments of the disclosure.

It is understood by persons skilled in the art that the above description is only preferred embodiments of the disclosure and the embodiments are not intended to limit the disclosure. Any modifications, equivalent substitutions, and improvements made within the spirit and principles of the disclosure should be included in the protection scope of the disclosure.

In general, the above technical solution conceived by the disclosure has the following beneficial effects compared with the related art:

By using the stripe image data set and GAN to generate adversarial tasks of two contradictory natures, the image reconstruction accuracy and the stripe extraction accuracy may be effectively balanced, and the image reconstruction model and the stripe extraction model suitable for visible light communication scenarios may be obtained.

What is claimed is:

1. A stripe image processing method for camera optical communication, comprising:

obtaining a stripe image data set, wherein the stripe image data set comprises a stripe image sample and a stripe sequence label corresponding to the stripe image sample and a stripe-free image label; and based on the stripe image sample and the stripe sequence label corresponding to the stripe image sample and the stripe-free image label, training a generative adversarial network to obtain an image reconstruction model and a stripe extraction model, wherein the image reconstruction model is configured to reconstruct a stripe image into a stripe-free image, and the stripe extraction model is configured to extract stripes based on stripe images;

wherein the image reconstruction model serves as a generator of the generative adversarial network, and the stripe extraction model serves as a discriminator of the generative adversarial network;

the training of the generative adversarial network based on the stripe image sample and the stripe sequence label corresponding to the stripe image sample and the stripe-free image label to obtain the image reconstruction model and the stripe extraction model comprises:

based on the stripe image sample and the stripe sequence label corresponding to the stripe image sample and the stripe-free image label, continuing to calculate a loss value and optimize model parameters until a training stop condition is met;

the calculating of the loss value and the optimizing of the model parameters comprises:

inputting the stripe image sample and the corresponding stripe sequence label to the image reconstruction model to obtain a reconstructed image in a training phase output by the image reconstruction model;

inputting the stripe image sample to the stripe extraction model to obtain a stripe extraction result of the stripe image sample output by the stripe extraction model, inputting the stripe-free image label to the stripe extraction model to obtain a stripe extraction result of the stripe-free image output by the stripe extraction model, and inputting the reconstructed image in the training stage to the stripe extraction model to obtain a stripe extraction result of the reconstructed image output by the stripe extraction model;

based on the reconstructed image in the training stage, the stripe extraction result of the reconstructed image, and the stripe-free image label, obtaining the loss value corresponding to the image reconstruction model, and based on the stripe extraction result of the stripe image sample, the stripe extraction result of the stripe-free image, the stripe extraction result of the reconstructed image, and the stripe sequence label, obtaining the loss value corresponding to the stripe extraction model; and based on the loss value corresponding to the image reconstruction model and the loss value corresponding to the stripe extraction model, optimizing the model parameters through a back-propagation method;

based on the reconstructed image in the training stage, the stripe extraction result of the reconstructed image, and the stripe-free image label, the obtaining of the loss value corresponding to the image reconstruction model comprises:

comparing a difference between pixels in the reconstructed image in the training stage and corresponding pixels in the stripe-free image label to obtain a first-type generator loss;

comparing a difference between the stripe extraction result of the reconstructed image and a stripe sequence corresponding to the stripe-free image to obtain a second-type generator loss; and based on the first-type generator loss and the second-type generator loss, performing a weighted sum to obtain the loss value corresponding to the image reconstruction model;

based on the stripe extraction result of the stripe image sample, the stripe extraction result of the stripe-free image, the stripe extraction result of the reconstructed image, and the stripe sequence label, the obtaining of the loss value corresponding to the stripe extraction model, comprises:

comparing a difference between the stripe extraction result of the stripe image sample and the stripe sequence label to obtain a first-type discriminator loss;

comparing a difference between the stripe extraction result of the stripe-free image and the stripe sequence corresponding to the stripe-free image to obtain a second-type discriminator loss;

comparing a difference between the stripe extraction result of the reconstructed image and the stripe sequence label to obtain a third-type discriminator loss; and based on the first-type discriminator loss, the second-type discriminator loss, and the third-type discriminator loss, performing a weighted sum to obtain the loss value corresponding to the stripe extraction model.

2. The stripe image processing method for camera optical communication according to claim 1, wherein after obtaining the image reconstruction model and the stripe extraction model, the method further comprises:

obtaining stripe images of a surrounding environment through a camera, wherein light sources in the surrounding environment flicker under a control of a visible light communication apparatus;

inputting the stripe image to the image reconstruction model to obtain a reconstructed image output by the image reconstruction model, and/or inputting the stripe image to the stripe extraction model to obtain a stripe sequence output from the stripe extraction model.

3. The stripe image processing method for camera optical communication according to claim 2, wherein the image reconstruction model is constructed based on an encoder and a decoder, feature maps of the encoder and the decoder are connected through skip connections, the encoder is configured to downsample image features, and the decoder is configured to upsample image features.

4. The stripe image processing method for camera optical communication according to claim 3, wherein one or more skip connections in the image reconstruction model are constructed based on a dual cross-attention (DCA) module.

5. The stripe image processing method for camera optical communication according to claim 2, wherein the stripe extraction model is constructed by cascading a sequence generation network, multiple convolutional layers, a linear layer, and an activation function module.

6. The stripe image processing method for camera optical communication according to claim 1, wherein the image reconstruction model is constructed based on an encoder and a decoder, feature maps of the encoder and the decoder are connected through skip connections, the encoder is configured to downsample image features, and the decoder is configured to upsample image features.

7. The stripe image processing method for camera optical communication according to claim 6, wherein one or more skip connections in the image reconstruction model are constructed based on a dual cross-attention (DCA) module.

8. The stripe image processing method for camera optical communication according to claim 1, wherein the stripe extraction model is constructed by cascading a sequence generation network, multiple convolutional layers, a linear layer, and an activation function module.

9. An electronic apparatus, comprising:
   at least one memory, configured to store a computer program;
   at least one processor, configured to execute a program stored in the memory, wherein when the program stored in the memory is executed, the processor is configured to execute the method according to claim 1.

10. An electronic apparatus, comprising:
    at least one memory, configured to store a computer program;
    at least one processor, configured to execute a program stored in the memory, wherein when the program stored in the memory is executed, the processor is configured to execute the method according to claim 2.

11. An electronic apparatus, comprising:
    at least one memory, configured to store a computer program;
    at least one processor, configured to execute a program stored in the memory, wherein when the program stored in the memory is executed, the processor is configured to execute the method according to claim 3.

12. An electronic apparatus, comprising:
    at least one memory, configured to store a computer program;
    at least one processor, configured to execute a program stored in the memory, wherein when the program stored in the memory is executed, the processor is configured to execute the method according to claim 4.

13. An electronic apparatus, comprising:
    at least one memory, configured to store a computer program;
    at least one processor, configured to execute a program stored in the memory, wherein when the program stored in the memory is executed, the processor is configured to execute the method according to claim 5.

14. An electronic apparatus, comprising:
    at least one memory, configured to store a computer program;
    at least one processor, configured to execute a program stored in the memory, wherein when the program stored in the memory is executed, the processor is configured to execute the method according to claim 6.

15. An electronic apparatus, comprising:
    at least one memory, configured to store a computer program;
    at least one processor, configured to execute a program stored in the memory, wherein when the program stored in the memory is executed, the processor is configured to execute the method according to claim 7.

16. An electronic apparatus, comprising:
    at least one memory, configured to store a computer program;
    at least one processor, configured to execute a program stored in the memory, wherein when the program stored in the memory is executed, the processor is configured to execute the method according to claim 8.

\* \* \* \* \*